H. Moeser.
Printing Addresses.
No. 2161.
Fig. 5. Reissued Jan. 30 1866.
Fig. 7.
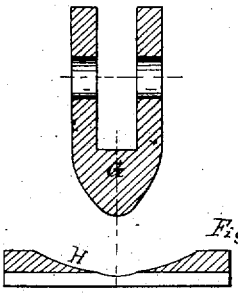
Fig. 6.
Fig. 4.
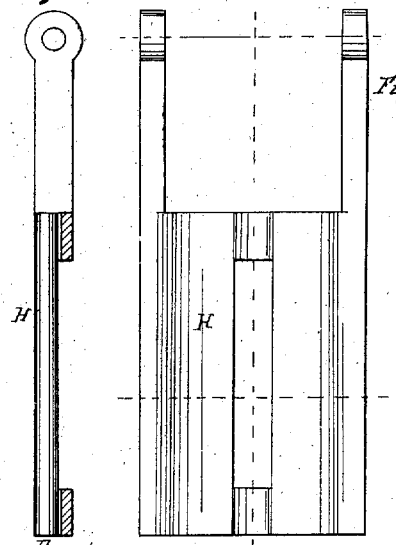
Fig. 1.
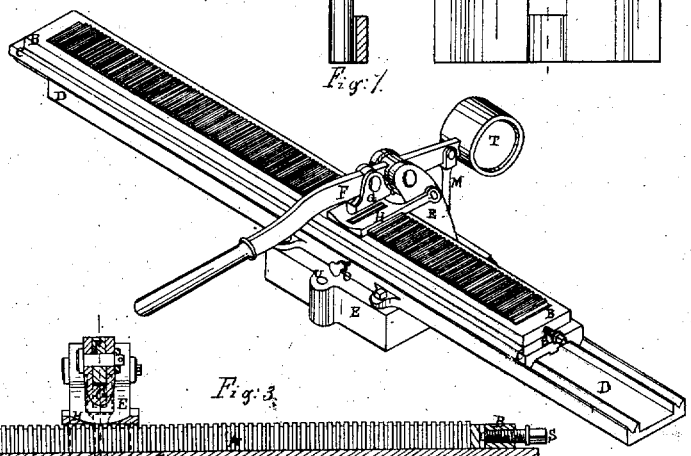
Fig. 3.
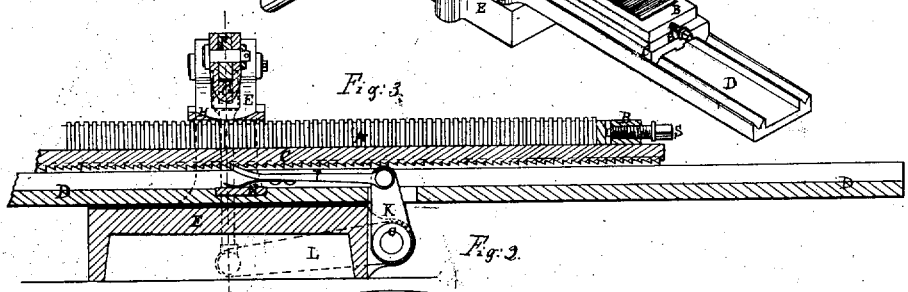
Fig. 2.
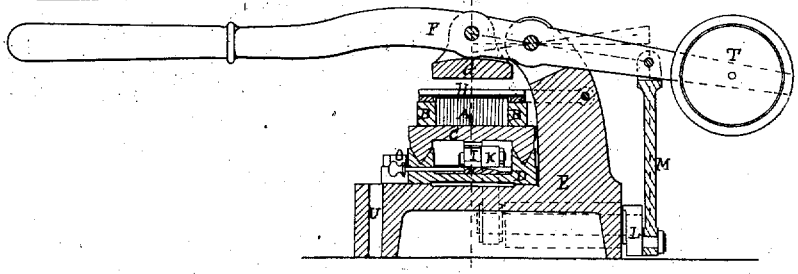

UNITED STATES PATENT OFFICE.

HENRY MOESER, OF PITTSBURG, PENNSYLVANIA.

IMPROVEMENT IN PRINTING NAMES OF SUBSCRIBERS UPON NEWSPAPERS, &c.

Specification forming part of Letters Patent No. 8,175, dated June 24, 1851; extended seven years; Reissue No. 2,161, dated January 30, 1866.

*To all whom it may concern:*

Be it known that I, HENRY MOESER, of Pittsburg, in the county of Allegheny and State of Pennsylvania, have invented a new useful Machine for Printing Names of Persons or Places on Newspapers or other Periodical Papers, Letters, &c.; and I do hereby declare the following to be a full, clear, and exact description of the construction and operation of the same, reference being had to the accompanying drawings, making part of this specification, in which—

Figure 1 is a perspective view. Fig. 2 is a transverse vertical section. Fig. 3 is a longitudinal vertical section. Figs. 4 to 7 are plan views and sections of some parts referred to in the following description.

Similar letters of reference indicate like parts in all the drawings.

Prior to the date of my invention newspapers, pamphlets, periodicals, &c., have been addressed in writing copied from the subscription-book.

My invention obviates the labor of writing; and consists, first, in a mechanical record of names and addresses of subscribers of newspapers, periodicals, &c., or of correspondents to whom it is desirable to send circulars, documents, or other mail-matter, said mechanical record being constituted of type proper for printing and representing said names or addresses locked up in standing form or forms, capable of such changes, additions, and alterations as occasion may require, and also capable of being used in connection with a press for printing said names, addresses, &c., the said form of type being both a record or list of existing subscribers or correspondents which can be referred to from time to time for information and a means of printing the names and addresses of subscribers and correspondents.

The second part of my invention consists in combining with a standing address form or mechanical record of names, &c., and a printing mechanism an automatic feed for moving the forms for the successive impressions.

The third part of my invention consists in combining with an address-form or mechanical record of names, &c., and a printing and feeding mechanism a shield provided with a slot to shield and protect the paper except at the point of impression.

The machine consists of levers, a slide, and a set of type combined in such a manner as to readily print any number of names on newspapers, pamphlets, &c. Thus to print the names of subscribers on newspapers the following plan is pursued:

The names of persons or places, &c., to be printed are set up in type in a column and secured in a form, which moves by means of a slide beneath a stamp in such manner that every name or address in the column, one after another, is subject to the action of the stamp, and so that paper after paper brought between the stamp and the type receives the proper impression.

A is a column of names to be printed, set up in type.

B is the form or frame which contains the type-names, which are locked in the frame by the screw S.

C is a slide on which the form B rests.

D is the slide-bed on which the slide moves.

E is the bed-plate or table to which the slide-bed D is secured by means of screws.

F is the impression-lever, provided with a handle and a weight or counterbalance, T.

G is the stamp, pivoted to the lever F, which acts upon the paper and brings it contact with the type.

H is a plate which lies close over the type, but does not touch them. It is of concave shape and provided with a slit. Fig. 4 is a plan view of it, and Figs. 5 and 6 longitudinal and transverse sections of the same, full size. By this shape of the stamp G (shown in Fig. 7 in transverse section, full size) any paper brought between the stamp and the plate is allowed to be pressed down on that line of the column of names which is left uncovered by the slit in the plate, while the paper is shielded at the same time from the addresses or lines adjoining that under action. The plate H is connected to the bed-plate of the machine by screws and is supported by the form B, a portion being cut away, as shown, to allow the address-form to slide freely.

I is a spring-pawl which meshes into the rack cut on the under side of the slide C.

K is an arm connected with the spring-pawl by a pin.

L is another arm, secured on the shaft of the arm K, and connected with the main lever F by the link M. Each raising of the main lever F will give a movement to the slide. The proportions of the arms K and L are such that the advance of the slide at every stroke is equal to the distance from one tooth to the other on the slide. This distance agrees with the distance from line to line in the column A. N is a wedge with a handle, O, which supports the spring of the pawl I. By drawing the wedge back the spring-pawl sets down and gets out of contact with the rack, so that the slide may be moved freely on its bed.

Before the operation of the machine is to commence, the whole set of names in the form is inked at once and put on the slide, so that the first name on the column is under the slit in the plate H. The operator then takes the article to be addressed and places it over the type-name, and by pressing the lever F down the printed impression is taken through the shield. By raising the lever again the form is moved by the pawl and rack and a second name is brought under the stamp, and the operation is continued until all the names in the list are printed on the papers, periodicals, or whatever the articles may be. As many forms may be used as necessary to contain the entire subscription list.

The advantages of my invention will be obvious to persons familiar with mailing the editions of newspapers, magazines, &c. The addresses can be printed at the rate of two thousand per hour. The expense and trouble of applying wrappers to the papers is saved, and the liability to mistakes and errors common to writing off the names is entirely obviated.

I claim—

1. The within-described mechanical record of names and addresses of subscribers of newspapers, periodicals, &c., or correspondents to whom it is desirable to send circulars, documents, or other mail-matter, said mechanical record being constituted of type and representing said names, addresses, and so forth, locked up in a standing form or forms capable of such changes, additions, or alterations in the names or addresses as occasion may require, and also capable of being used in connection with a press for printing said names, addresses, &c., the said form of type being both a record or list of existing subscribers or correspondents, which can be referred to from time to time for information and a means of printing the names and addresses of subscribers, correspondents, &c., substantially as described and specified.

2. Combining with a standing address form or forms, or mechanical record of names, &c., and a press mechanism, as described, an automatic feed for moving the forms step by step for the successive address-impressions, substantially as described and specified.

3. Combining with standing address-forms or mechanical record of names, &c., and a printing and feeding mechanism, as described, a shield, or equivalent device, provided with a slot to shield and protect the paper from ink except at the point of impression, substantially as described and specified.

HENRY MOESER.

Witnesses:

AUGUST HAYES,

G. MOESER.